US010939107B2

(12) United States Patent
Sarwer et al.

(10) Patent No.: US 10,939,107 B2
(45) Date of Patent: Mar. 2, 2021

(54) EMBEDDED CODEC CIRCUITRY FOR SUB-BLOCK BASED ALLOCATION OF REFINEMENT BITS (71) Applicant: SONY CORPORATION, Tokyo (JP)

(72) Inventors: Mohammed Golam Sarwer, San Jose, CA (US); Ali Tabatabai, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 23 days.

(21) Appl. No.: 16/289,873

(22) Filed: Mar. 1, 2019

(65) Prior Publication Data

US 2020/0280720 A1 Sep. 3, 2020

(51) Int. Cl.
H04N 19/124 (2014.01)
H04N 19/176 (2014.01)
H04N 19/91 (2014.01)

(52) U.S. Cl.
CPC ......... *H04N 19/124* (2014.11); *H04N 19/176* (2014.11); *H04N 19/91* (2014.11)

(58) Field of Classification Search
CPC .... H04N 19/18; H04N 19/117; H04N 19/132; H04N 19/176; H04N 19/126; H04N 19/14; H04N 19/61; H04N 19/124; H04N 19/91; H03M 7/42
See application file for complete search history.

(56) References Cited

U.S. PATENT DOCUMENTS

| 8,422,546 | B2 | 4/2013 | Lin et al. |
| 8,457,198 | B2 | 6/2013 | Baik |
| 8,817,884 | B2 | 8/2014 | Kudana et al. |
| 2006/0153294 | A1* | 7/2006 | Wang ............... H04N 19/59 375/240.08 |
| 2010/0290533 | A1* | 11/2010 | Minagawa ........ H04N 19/176 375/240.23 |
| 2011/0211636 | A1 | 9/2011 | Yamada et al. |
| 2014/0140400 | A1* | 5/2014 | George ............. H04N 19/70 375/240.12 |
| 2014/0307801 | A1 | 10/2014 | Ikai |
| 2015/0201191 | A1 | 7/2015 | Cheong |
| 2016/0261870 | A1 | 9/2016 | Tu et al. |

FOREIGN PATENT DOCUMENTS

| JP | 2017169209 A | 9/2017 |
| JP | 2016129405 A | 7/2018 |
| KR | 101266577 B | 5/2013 |
| KR | 20160098109 A | 8/2016 |

* cited by examiner

Primary Examiner — Tracy Y. Li
(74) Attorney, Agent, or Firm — Chip Law Group (57) ABSTRACT An embedded codec (EBC) circuitry includes a memory to store a plurality of one dimensional (1D) sub-blocks of quantized-transformed residual levels for a 1D image block and encoder circuitry to determine a sub-block category from a set of sub-block categories for each 1D sub-block of the plurality of 1D sub-blocks. The encoder circuitry encodes the plurality of 1D sub-blocks by application of an entropy coding scheme to generate a plurality of encoded 1D sub-blocks. The encoder circuitry allocates a plurality of refinement bits at bit-positions in bit-planes corresponding to encoded quantized-transformed residual levels in an encoded 1D sub-block of the plurality of encoded 1D sub-blocks, based on the determined sub-block category of a corresponding 1D sub-block.

21 Claims, 6 Drawing Sheets

EMBEDDED CODEC CIRCUITRY FOR SUB-BLOCK BASED ALLOCATION OF REFINEMENT BITS

CROSS-REFERENCE TO RELATED APPLICATIONS/INCORPORATION BY REFERENCE

None.

FIELD

Various embodiments of the disclosure relate to an embedded codec for image and video compression or decompression. More specifically, various embodiments of the disclosure relate to embedded codec circuitry for sub-block based allocation of refinement bits.

BACKGROUND

With recent advancements in imaging technologies, there is an increasing demand for on-chip codecs in image capturing and display devices that can handle compression and storage of different images or video in wide variety of image resolutions (e.g., low to high resolution images/video). Currently, an image or video may be subjected to multiple coding techniques, for example, transform coding, residual prediction, quantization, entropy coding, and the like, to achieve a desired compression. Typically, after the entropy coding, there may be still un-coded bits available in bit-planes within a bit budget of an encoded image block. In certain scenarios, the un-coded bits may be refined by allocating equal number of refinement bits in a predetermined sequence in each encoded image block. In such scenarios, the allocation of equal number of refinement bits in each encoded image block may not only result in visible image artifacts, but may also lead to compression inefficiency and sub-optimal memory usage, especially in on-chip codes where it is desirable to achieve an area efficiency with respect to throughput while minimizing an on-chip memory usage.

Further limitations and disadvantages of conventional and traditional approaches will become apparent to one skill in the art, through comparison of described systems with some aspects of the present disclosure, as set forth in the remainder of the present application and with reference to the drawings.

SUMMARY

An embedded codec (EBC) circuitry and a method for sub-block based allocation of refinement bits are provided, substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various embodiments of the present disclosure may be found in a method and embedded codec (EBC) circuitry for sub-block based allocation of refinement bits. The EBC circuitry may include a memory and encoder circuitry that handles generation of encoded bit-stream of a 1D image block. The disclosed EBC circuitry classifies different sub-blocks of a 1D image block into different sub-block categories, based on a complexity level and a flatness level of different sub-blocks. The disclosed EBC circuitry further allocates refinement bits in un-coded bits positions at a sub-block level based on a sub-block category associated with a corresponding 1D sub-block. The differentiation at a sub-block level further renders an opportunity to adaptively reduce an allocation of refinement bits to a sub-block based on a level of complexity represented at the sub-block level. For example, a flat sub-block, i.e. a 1D sub-block that has all the AC coefficients as zero may not require all un-coded bit-positions to be refined, and whereas a complex sub-block, i.e. a 1D sub-block that has AC coefficients with larger values (e.g., greater than zero or near-zero values, e.g., −2, −1, 0, 1, 2) may require all the un-coded bit positions to be refined. The selective allocation of refinement bits at the sub-block level improves the image quality as the image sub-block (complex-level sub-block) which requires more number of bits to represent larger AC coefficients values is allocated the maximum number of refinement bits. As a result of such selective allocation of refinement bits at the sub-block level, compression efficiency is significantly improved without an adverse impact on quality of encoded image. Further, an area efficiency with respect to throughput of the disclosed EBC circuitry is enhanced and an on-chip memory usage is optimized.

Figure 1:
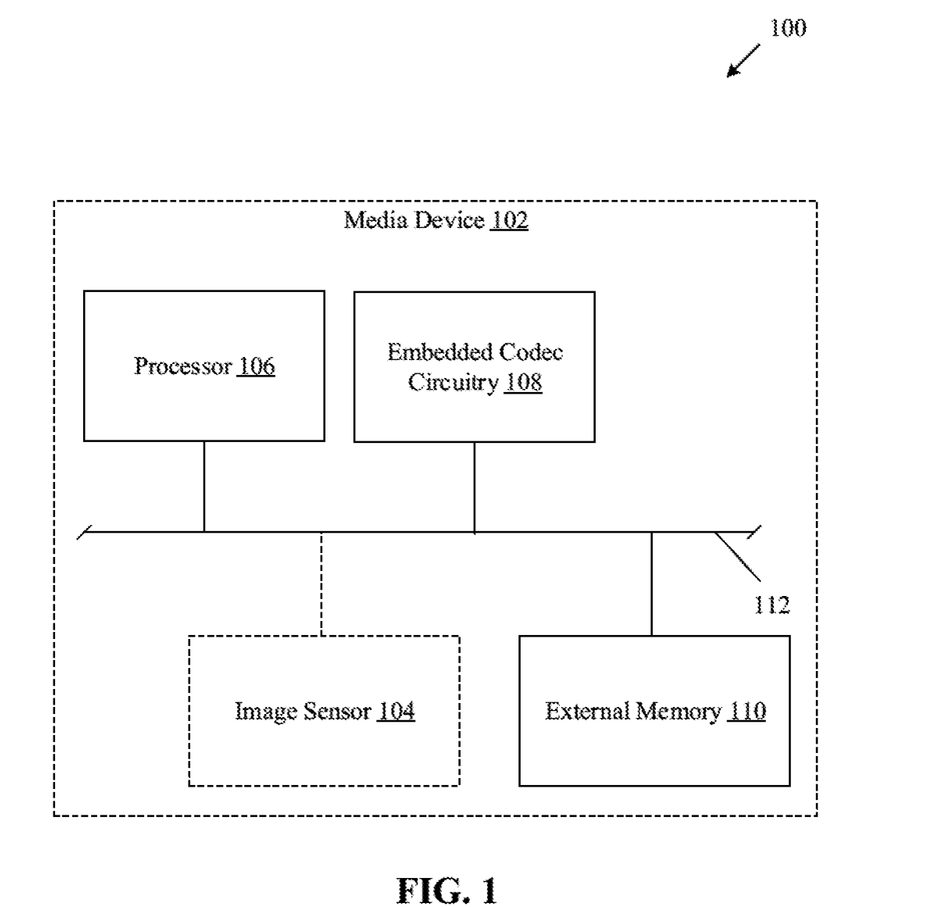
FIG. 1 is a block diagram that illustrates an exemplary media device with an embedded codec (EBC) circuitry and other circuitries for sub-block based allocation of refinement bits, in accordance with an embodiment of the disclosure.

FIG. 1 is a block diagram that illustrates an exemplary media device with an embedded codec (EBC) circuitry and other circuitries for sub-block based allocation of refinement bits, in accordance with an embodiment of the disclosure. With reference to FIG. 1, there is shown a media device 102 that includes a processor 106, an embedded codec (EBC) circuitry 108, and an external memory 110. In some embodiments, an image sensor 104 may be communicatively coupled to the processor 106, the EBC circuitry 108, and the external memory 110. There is further shown a system bus 112 that interconnects the image sensor 104, the processor 106, the EBC circuitry 108, and the external memory 110.

The media device 102 may comprise suitable logic, circuitry, and interfaces that may be configured to store uncompressed raw images and/or videos as encoded (i.e. compressed) images and/or videos in the external memory 110. The media device 102 may be further configured to manage encoding as well as decoding of media content (for example, encoded images and/or videos) and further playback of the decoded media content at the media device 102. The media device 102 may include a dedicated on-chip codec (such as the EBC circuitry 108) for an offline (without the need for Internet/network) processing and compression/decompression of images/video. In some embodiments, the media device 102 may also include one or more image sensors (such as the image sensor 104) to capture images in a raw image file format, which is an uncompressed file format. In such cases, the captured image may be encoded by the EBC circuitry 108 of the media device 102. Examples of the media device 102 may include, but are not limited to, a digital camera, a portable communication device (e.g. laptops, smartphones, tablets, phablets, smart watches, smart glasses, etc.), a media server, a workstation, a desktop computer, and augmented reality/Virtual Reality/Mixed Reality (AR/VR/MR) devices.

Although not shown in FIG. 1, the media device 102 may also include a network interface that may be configured to manage sharing of encoded and/or raw uncompressed images and/or videos with other peripheral or peer-connected devices, through a communication network (also not shown). The detailed description of the network interface and the communication network has been omitted from the present disclosure for the sake of brevity.

The image sensor 104 may comprise suitable logic, circuitry, and interfaces that may be configured to capture a raw uncompressed image or a sequence of raw uncompressed images of a scene in a field-of-view (FOV) of the image sensor 104. The image sensor 104 may be implemented as an active pixel sensor, such as a complementary-metal-oxide semiconductor (CMOS) sensor. In such implementation, the image sensor 104 may be configured to execute progressive scan (line-by-line) of each row or column of pixels (one dimensional (1D) pixel-array or 1D image block) on a sensor core of the CMOS sensor. The progressive scan may be a vertical scan (column wise) or a horizontal scan (row wise). In some embodiments, instead of an active pixel sensor, the image sensor 104 may be implemented as one of a passive pixel sensor (such as a charged coupled device (CCD) sensor, an oversampled binary image sensor, a planar Fourier capture array (PFCA), a back-illuminated (BSI or BI) sensor, and the like. Although not shown, the image sensor 104 may also include a specialized microprocessor (or a microcontroller) that is configured to operate in accordance with image data from the image sensor 104, a graphic processing unit (GPU) to process images stored in a frame buffer, and/or a memory integrated with the image sensor 104.

The processor 106 may comprise suitable logic, circuitry, and interfaces that may be configured to execute a set of instructions stored in a dedicated memory (e.g., the external memory 110 or an on-chip memory in the EBC circuitry 108). The processor 106 may be implemented based on a number of processor technologies known in the art. Examples of the processor 106 may include, but are not limited to, a Graphical Processing Unit (GPU), a co-processor (such as a specialized image co-processor) for a processor, a specialized digital signal processor, a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor.

The EBC circuitry 108 may comprise suitable logic, circuitry, and interfaces that may be configured to encode a 1D image block (e.g., 16×1 or an 8×1 image block) as per a specific compression factor. The EBC circuitry 108 may be further configured to refine the encoded 1D image block, in response to instructions received at the EBC circuitry 108. In some embodiments, the 1D image block may be part of an input image (i.e. a raw uncompressed image) or a pixel array (row or column) retrieved directly from a read out register of the image sensor 104, following a row-wise or a column-wise scan by the image sensor 104. The EBC circuitry 108 may further manage storage of a bit-stream of encoded 1D image block in the external memory 110 or may manage transfer of the bit-stream of encoded 1D image to other media devices via dedicated communication networks.

The EBC circuitry 108 may be implemented as a specialized hardware encoder/decoder interfaced with the other computational circuitries of the media device 102. In such implementation, the EBC circuitry 108 may be associated with a specific form factor on a specific computational circuitry. Examples of the specific computational circuitry may include, but are not limited to, a field programmable gate array (FPGA), programmable logic devices (PLDs), an application specific integrated circuit (ASIC), a programmable ASIC (PL-ASIC), application specific integrated parts (ASSPs), and a System-on-Chip (SOC) based on standard microprocessors (MPUs) or digital signal processors (DSPs). In accordance with another embodiment, the EBC circuitry 108 may also interface with a graphical processing unit (GPU) to parallelize operations of the EBC circuitry 108. In accordance with yet another embodiment, the EBC circuitry 108 may be implemented as a combination of programmable instructions stored in a memory and logical units (or programmable logic units) on a hardware circuitry of the media device 102.

The external memory 110 may comprise suitable logic, circuitry, and interfaces that may be configured to store an input image (uncompressed raw or encoded) or a sequence of input images. The external memory 110 may be further configured to act as an image buffer to store raw uncompressed 1D image blocks retrieved directly from the image sensor 104. Additionally, the external memory 110 may store instructions associated with sequential encoding/decoding schemes that may be applied, by the EBC circuitry 108, to generate a bit-stream of encoded 1D image block. In an exemplary embodiment, the external memory 110 may be a persistent storage memory or a dynamic random access memory (DRAM) that may be externally interfaced with the EBC circuitry 108. In another exemplary embodiment, the external memory 110 may be static random access memory (SRAM) circuits that may be externally interfaced with the EBC circuitry 108. Further examples of implementation of the external memory 110 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

In some embodiments, the EBC circuitry 108 may also provide support (e.g., a backward compatibility) for different other codec standards that may include Advanced Video Codec (AVC)/Media Experts Group (MPEG-4/AVC) or H.264, MPEG-4/HEVC or H.265, and the like. Additionally, the video codec may be supported by other codec libraries that may include FFmpeg, Xvid, DIVx, VP1-9, Windows Media Codec, FFavs, and the like.

The system bus 112 may be a hardware bus that may include a set of data channels (or conductive paths) to different components of the media device 102. Alternatively stated, the system bus 112 may interconnect at least data ports, address ports, and control signal ports of different components of the media device 102. For example, the system bus 112 may interconnect the image sensor 104, the processor 106, the EBC circuitry 108, the external memory 110, and other circuitries to each other. The system bus 112 may be configured to facilitate a serial data communication or parallelized data communication between different components on-board the media device 102. Examples of the system bus 112 may include an 8-bit parallel single system bus, a 16-bit parallel single system bus, a 32-bit parallel single system bus, a 64-bit parallel single system bus, a serial data bus, and the like.

In operation, a 1D image block or a sequence of 1D image blocks may be received by the media device 102. In some embodiments, the 1D image block or the sequence of 1D image blocks may be retrieved directly from a read-out register of an on-chip image sensor (such as the image sensor 104) or a camera device interfaced with the media device 102. In other embodiments, the 1D image block or the sequence of 1D image blocks may be retrieved from an uncompressed raw input image stored in a persistent storage, such as the external memory 110, of the media device 102 or received externally from other media storage devices, such as cameras, data servers, etc.

The EBC circuitry 108 may be configured to retrieve the 1D image block or the sequence of 1D image blocks from the external memory 110 or directly from the read out register of the image sensor 104. The EBC circuitry 108 may be configured to execute a sequential encoding scheme on the 1D image block to generate a bit-stream of encoded 1D image block. The bit-stream of encoded 1D image block may include header information that may indicate the sequential encoding scheme applied at encoding of the 1D image block, to obtain the bit-stream of encoded 1D image block. In one implementation, the sequential encoding scheme may include a sequential application of a 1D transform, followed by quantization, a residual prediction, and an entropy coding scheme.

In a sequential encoding scheme, the EBC circuitry 108 may be configured to partition the 1D image block for example, a "16×1" image block, into a plurality of 1D image sub-blocks. The plurality of 1D image sub-blocks may correspond to a logical partition of the 1D image block into regions that have sharp change in pixel values at edges. For example, a "16×1" image block may be partitioned into four "4×1" 1D image sub-blocks, where each "4×1" 1D image sub-block may include strong edges, i.e. a larger difference in pixel values at edges of two consecutive "4×1" 1D image sub-blocks.

The EBC circuitry 108 may be further configured to apply a 1D forward transform separately on each 1D image sub-block of the plurality of 1D image sub-blocks, to generate a plurality of 1D transform coefficients. In accordance with an embodiment, the 1D forward transform may be based on a family of sinusoidal unitary transforms (that includes a family of orthonormal bases or eigenvectors). Examples of the 1D forward transform may include, but are not limited to, type I-VIII Discrete Cosine Transform (DCT), type I-VIII Discrete Sine Transform (DST), Discrete Wavelet Transform (DWT), and a Dual-Tree Complex Wavelet Transform (DCWT).

For example, a "4×1" 1D DCT transform may be applied on each "4×1" image sub-block of a "16×1" image block. Similarly, an "8×1" 1D DCT transform may be applied on each "8×1" image sub-block of a "16×1 image block". Thus, as a result, a type of the 1D transform applied on the 1D image block may be based on a size of each 1D image sub-block of the 1D image block. The size of each 1D image sub-block of the plurality of 1D image sub-blocks may be specified prior to the encoding of the 1D image block.

The EBC circuitry 108 may be further configured to quantize the plurality of 1D transform coefficients for each 1D image sub-block to generate a plurality of quantized-transformed levels. The plurality of quantized-transformed levels may be separated from each other by a plurality of discretized quantization bins. A step size for the plurality of quantization bins may be further selected adaptively or uniformly to efficiently quantize a 1D sub-block of transform coefficients into a plurality of quantized-transformed levels. Each quantized-transformed level may be a mid-value from an upper bound and a lower bound of a quantization bin, for example, a quantization bin of "(155,175)" may include a quantized-transformed level of "(155+175)/2", i.e. "165". With quantization, the EBC circuitry 108 may remove redundant coefficient information from transform domain data (i.e. the plurality of transform coefficients for each 1D sub-block of a plurality of 1D sub-blocks) without a visually noticeable degradation of quality.

The plurality of quantization bins may be determined based on a quantization parameter (QP), which may vary with a defined rate in accordance with an adaptive quantization scheme to encode or decode the media content. The QP may vary from 0 to a bit depth of a bit-stream of encoded 1D image block. For example, a QP for an 8-bit bit-stream of compressed 1D image block may be selected as "7" for a first 1D sub-block of transform coefficients and "0" for a second block of transform coefficients, which may indicate that the first 1D sub-block of transform coefficients may be quantized with a finer step size as compared to the second block and the second block may not be quantized at all. In certain embodiments, a quantization scheme that is implemented on the plurality of transform coefficients of each 1D sub-block of the plurality of 1D sub-blocks is a bit-plane quantization scheme.

The EBC circuitry 108 may be further configured to apply a residual prediction scheme on a plurality of 1D sub-blocks of quantized-transformed levels, where each 1D sub-block may include a plurality of quantized-transformed levels. After application of the residual prediction scheme, a plurality of 1D sub-blocks of quantized-transformed residual levels may be obtained from a plurality of 1D sub-blocks of quantized-transformed levels. The plurality of 1D sub-blocks of quantized-transformed residual levels for a 1D image block may be stored in a memory, such as the external memory 110 or an on-chip memory (e.g., a dedicated SRAM or an on-chip cache) in the EBC circuitry 108. Examples of the residual prediction scheme may include, but are not limited to, a Pulse Coded Modulation (PCM) scheme, a Differential Pulse Code Modulation (DPCM) scheme, or an Adaptive DPCM (ADPCM) scheme. In DPCM and ADPCM schemes, instead of utilizing each quantized-transformed level, a residue is predicted from reference quantization levels.

Each 1D sub-block, for example, a "4×1" sub-block, may include a plurality of quantized-transformed residual levels, which may be further include into a DC quantized-transformed residual level and a plurality of AC quantized-transformed residual levels. Here, "DC" represents direct current (DC) term which is a first term in an image block or a sub-block, and thus exhibit a zero frequency and remaining elements are known as alternative current (AC) terms (also referred to as AC values or coefficients) that exhibit a non-zero frequency. Thus, AC quantized-transformed residual levels corresponds to quantized-transformed residual levels of AC coefficients (values).

The EBC circuitry 108 may be further configured to encode the plurality of 1D sub-blocks of quantized-transformed residual levels by application of an entropy coding scheme. As a result, a plurality of encoded 1D sub-blocks may be obtained, which include a plurality of bit-planes. The plurality of bit-planes may include encoded bits as well as un-coded bit-positions that may be refined with allocation of refinement bits. The entropy coding scheme may include, but is not limited to, a Huffman coding scheme, an exponential Golomb coding scheme, a progressive Golomb coding scheme, a Golomb-Rice coding scheme, and a combination of the Huffman coding scheme and the exponential Golomb coding scheme.

In order to allocate the refinement bits in an encoded 1D sub-block, the EBC circuitry 108 may be further configured to estimate a measure of a flatness level or a complexity level of each 1D sub-block prior to entropy encoding. The measure of a flatness level or a complexity level may be defined based on absolute values of AC quantized-transformed residual levels in each 1D sub-block of the plurality of 1D sub-blocks. Thus, the EBC circuitry 108 may be configured to classify each 1D sub-block into a sub-block category of a plurality of sub-block categories. For example, there may be three sub-block categories, i.e., a first sub-block category, a second sub-block category, and a third sub-block category. The first sub-block category may represent a low complexity level of AC quantized-transformed residual levels. The second sub-block category may represent a medium complexity level of AC quantized-transformed residual levels. The third sub-block category may represent a high complexity level of AC quantized-transformed residual levels.

The classification of a 1D sub-block of the plurality of 1D sub-blocks into a sub-block category may be based on allocation of a set of signaling bits to the 1D sub-block. Thus, the EBC circuitry 108 may be configured to allocate a set of signaling bits to each 1D sub-block of the plurality of 1D sub-blocks, in accordance with a measure of a complexity level or a flatness level of the corresponding 1D sub-block. For example, a set of signaling bits for a 1D sub-block that is associated with a first sub-block category, may be "0". The EBC circuitry 108 may be configured to select a number of refinement bits to be allocated in different 1D encoded sub-blocks, based on the allocated set of signaling bits to different 1D sub-blocks of quantized-transformed residual levels. The EBC circuitry 108 may utilize the allocated set of signaling bits at the refinement stage to determine a number of refinement bits to be allocated in an encoded 1D sub-block of a particular sub-block category.

The EBC circuitry 108 may be further configured to generate a bit-stream of an encoded 1D image block. The generated bit-stream may include the encoded bits and the allocated refinement bits. The number of refinement bits allocated depends on the available bit-budget and the number of encoded bits after compression. For example, for an input image block of 16 samples having 10 bit depth, it may be desired to have an output of 5 bit depth. After applying the encoding scheme, it is found that the output occupies only 74 bits, whereas bit budget is 16×5=80 bits. There are 6 un-coded bits which can be used to improve the image quality by allocating 6 refinement bits in a suitable refinement technique.

In accordance with another embodiment, an EBC decoder circuit (not shown in FIG. 1) of the EBC circuitry 108 may be configured to pre-store different coding tables (e.g., custom coding tables for Huffman encoding schemes, Exponential-Golomb encoding schemes, or signaling bit tables) and quantization tables. Therefore, the bit-stream of encoded 1D image block may need not include different coding tables and quantization tables.

In accordance with an embodiment, the EBC circuitry 108 may be configured to generate the bit-stream of encoded 1D image block such that the bit-stream may be decodable by different external decoders that may utilize different decoding schemes to decode the bit-stream of encoded 1D image block. In such a case, the EBC circuitry 108 may be configured to add different coding tables (e.g., custom coding tables for Huffman encoding schemes, Exponential-Golomb encoding schemes, or signaling bit tables) and quantization tables, in header information or a different meta-stream associated with the bit-stream of encoded 1D image block. By addition of such custom tables and quantization tables in the bit-stream, the output of the EBC circuitry 108 may be decodable by other decoder circuitries.

In accordance with an embodiment, the bit-stream of encoded 1D image block may be stored as part of an input image (such as a 2D image), a complete image, or a video portion, in the memory, such as the external memory 110 or an on-chip memory in the EBC circuitry 108. In one implementation, the processor 106 may be configured to transfer the bit-stream of encoded 1D image block, via the system bus 112, to a frame buffer (or a frame store) of a display circuitry (e.g., a video card) communicatively interfaced with the system bus 112 of the media device 102. The frame buffer may act as a compressed frame buffer for the display circuitry. The display circuitry (not shown in FIG. 1) may decode and further utilize the bit-stream of encoded bit-stream of 1D image block to display a patch of image at the media device 102. In another implementation, the processor 106 may be configured to transfer the bit-stream of encoded 1D image block, via the system bus 112, to a decoder buffer, such as a decoder picture buffer (DPB) of a video decoder, a buffer memory for an image decoder, or a coded picture buffer (CPB) of a video codec, in the media device 102.

In an exemplary implementation, the media device 102 may be a camera, such as a digital video camera or a digital image camera, and the bit-stream of encoded 1D image block may correspond to a 1D array of pixel values that are directly received from a read-out register of a CMOS sensor in the camera. In an exemplary embodiment, the EBC circuitry 108 may be implemented in the CMOS sensor circuitry.

Figure 2:
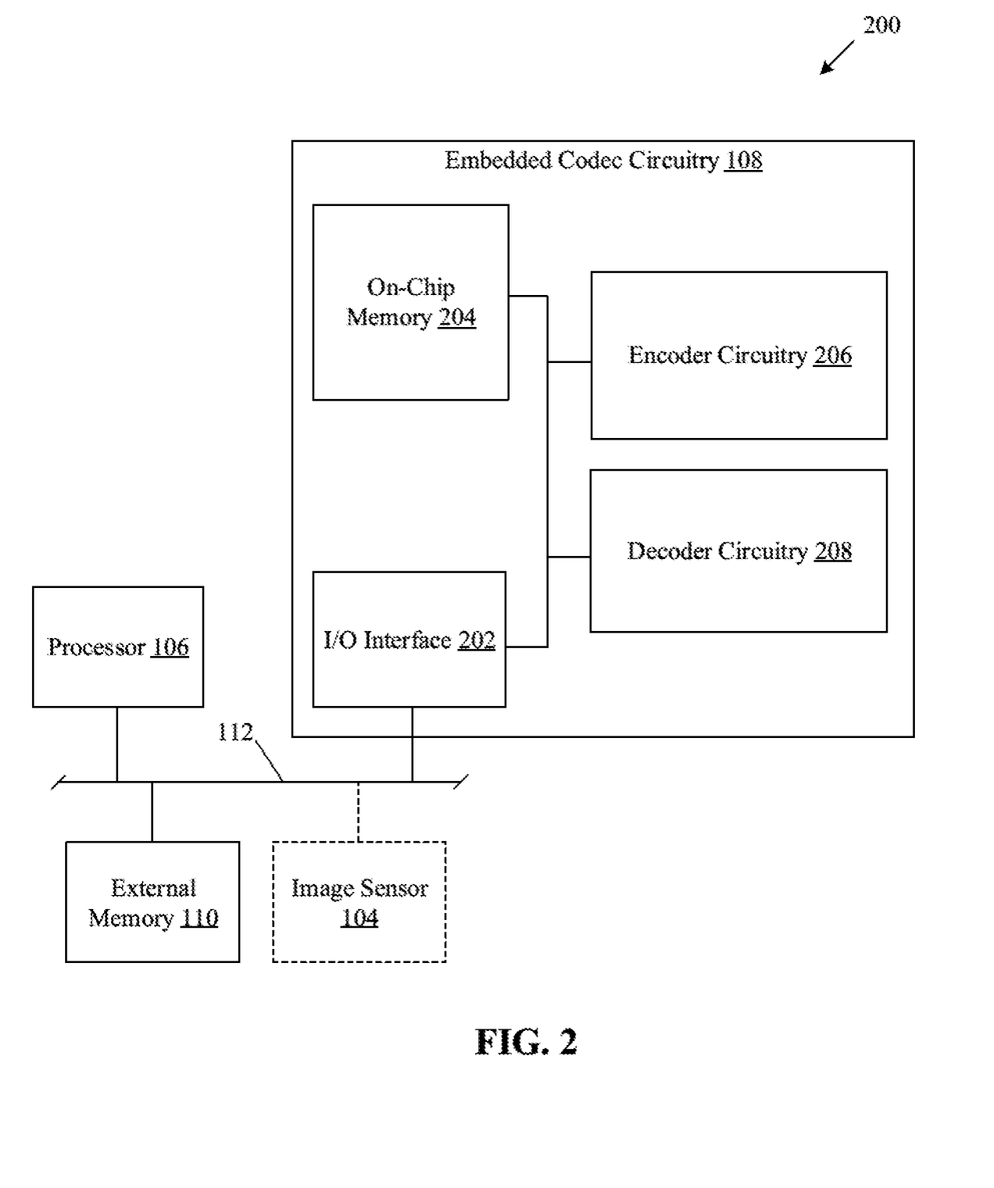
FIG. 2 is a block diagram that illustrates the EBC circuitry of FIG. 1 with various peripheral components for sub-block based allocation of refinement bits, in accordance with an embodiment of the disclosure.

FIG. 2 is a block diagram that illustrates an embedded codec (EBC) circuitry with various peripheral components for sub-block based entropy coding of quantized-transformed residual levels, in accordance with an embodiment of the disclosure. FIG. 2 is explained in conjunction with elements from FIG. 1. With reference to FIG. 2, there is shown a block diagram 200 of the EBC circuitry 108. The EBC circuitry 108 may include an Input/output (I/O) interface 202, an on-chip memory 204, an encoder circuitry 206, and a decoder circuitry 208. In the block diagram 200, there is also shown the image sensor 104, the processor 106, and the external memory 110 communicatively coupled to the EBC circuitry 108, via the system bus 112. In some embodiments, the processor 106 and the external memory 110 may be implemented inside the EBC circuitry 108, without a deviation from the scope of the disclosure.

The I/O interface 202 may comprise suitable logic, circuitry, and interfaces that may be configured to manage a plurality of I/O ports to facilitate exchange of communication data from other peripheral circuitries, via the system bus 112, for example, the external memory 110, the processor 106, or the image sensor 104. The communication data may include a bit-stream of the encoded 1D image block, control signals, CPU instructions, and the like. The configuration of the I/O ports may depend on a specification of the EBC circuitry 108, for example, physical I/O pins in an ASIC, FPGA or a SoC chip.

The on-chip memory 204 may comprise suitable logic, circuitry, and interfaces that may be configured to store different operational data (e.g., transform domain data, residual levels, quantization levels, entropy coded bits, etc.) that may be utilized by different components of the EBC circuitry 108 to encode the 1D image block. Examples of the operational data stored in the on-chip memory 204 may include, but are not limited to, a bit-stream of encoded 1D image block, transform-domain data, quantized-transformed levels, quantized-transformed residual levels, computed variables, and temporary processing data, and 1D/2D image blocks. The on-chip memory 204 may be implemented as a specific memory designed with a defined memory specification, such as a read/write speed, a memory size, fabrication factors, and the like. Examples of the on-chip memory 204 may include, but are not limited to, static random access memory (SRAM), dynamic access memory (DRAM), and Static Dynamic RAM (SD-RAM).

The encoder circuitry 206 may comprise suitable logic, circuitry, and interfaces that may be configured to generate a bit-stream of encoded 1D image block by application of a sequential encoding scheme on a 1D image block and followed by refinement, stored in a memory, such as the on-chip memory 204 or the external memory 110. The encoder circuitry 206 may also classify different 1D sub-blocks (of quantized-transformed residual levels) into different sub-block categories and allocate refinement bits in the encoded 1D sub-blocks based on different sub-block categories. The encoder circuitry 206 may allocate refinement bits to the 1D sub-blocks based on the sub-block categories, as some sub-blocks (complex level) require more details as compared to other sub-blocks (comparatively flat level). The complex-level sub-blocks may be allocated with more number of refinement bits as compared to the flat-level sub-blocks, which improves the details of a region of an encoded image, corresponding to the complex-level sub-block. In some embodiments, the encoder circuitry 206 may be a hardware encoder chip that may be implemented based on one of ASIC, programmable logic devices (PLDs), SOC, FPGA, digital signal processors (DSPs) or other specialized circuitries. In other embodiments, the encoder circuitry 206 may be implemented as a combination of hardware and stored set of instructions in the on-chip memory 204 (for example, instructions based on VHDL or HDL logic).

The decoder circuitry 208 may comprise suitable logic, circuitry, and interfaces that may be configured to decode a bit-stream of encoded 1D image block based on header information that includes a set of signaling bits allocated to each 1D sub-block of the plurality of 1D sub-blocks (associated with an encoded 1D image block). In some embodiments, the decoder circuitry 208 may have pre-stored quantization tables and coding tables that may act as a reference for the decoder circuitry 208 to decode the bit-stream of encoded 1D image block. In some embodiments, the decoder circuitry 208 may be a hardware encoder chip that may be implemented based on one of ASIC, programmable logic devices (PLDs), SOC, FPGA, digital signal processors (DSPs) or other specialized circuitries. In some embodiments, the decoder circuitry 208 may be implemented as a combination of hardware and programmed instructions in the on-chip memory 204 (for example, instructions based on VHDL or HDL logic).

In operation, a plurality of 1D sub-blocks of quantized-transformed residual levels of a 1D image block may be stored in the memory, such as the external memory 110 or the on-chip memory 204. Prior to storage, the plurality of 1D sub-blocks of quantized-transformed residual levels may be generated based on a sequential application of a 1D forward transform, followed by a quantization, and a residual prediction for a plurality of 1D image sub-blocks of the 1D image block. For example, in a "16×1" image block, there may be four "4×1" image sub-blocks. The encoder circuitry 206 may be configured to generate four "4×1" sub-blocks of quantized-transformed residual levels, based on a sequential application of a "4×1" DCT-II transform on each "4×1" sub-block, a bit-plane quantization for a quantization parameter of "7", and a DPCM coding scheme in each "4×1" sub-block of four "4×1" sub-blocks.

In order to entropy encode the plurality of 1D sub-blocks of quantized-transformed residual levels, the encoder circuitry 206 may be configured to retrieve the stored plurality of 1D sub-blocks of quantized-transformed residual levels from the memory, such as the external memory 110 or the on-chip memory 204. Each 1D sub-block may be a DC quantized-transformed residual level and a plurality of AC quantized-transformed residual levels, for example, a 4×1 sub-block may have one DC quantized-transformed residual level and three AC quantized-transformed residual levels.

The position of the DC and AC quantized-transformed residual levels in each 1D sub-block may be based on a direction (e.g., a left-to-right scan order or a right-to-left scan order for a 1D block or sub-block) selected for application of 1D forward transform. For example, an application of a 1D-row DCT transform may generate a DC transform coefficient at a first position and remaining AC transform coefficients at subsequent positions in a row of a 1D sub-block. Similarly, an application of a 1 D-column DCT transform may generate a DC transform coefficient at a first position and remaining AC transform coefficients at subsequent positions in a column of a 1D sub-block.

Different 1D sub-blocks in the plurality of 1D sub-blocks of quantized-transformed residual levels may exhibit a different level of complexity (or level of flatness). The level of complexity or flatness may correspond to difference in consecutive pixel values in a 1D sub-block. For example, a 1D sub-block in which there is large variation in pixel values may be considered as a complex sub-block, whereas a sub-block in which pixel values are relatively similar may be considered as a flat sub-block. The flat sub-block may comprise redundant pixel value which can be represented using a lesser number of bits as compared to the complex sub-block where each pixel value has a significant effect on the resultant output image.

The encoder circuitry 206 may be configured to classify the plurality of 1D sub-blocks of quantized-transformed residual levels of a 1D image block, in accordance with a sub-block category of a plurality of sub-block categories. The set of sub-block categories may include a first sub-block category, a second sub-block category, and a third sub-block category. Each sub-block category of the set of sub-block categories may indicate a different flatness level and a complexity level for a corresponding 1D sub-block of the plurality of 1D sub-blocks. More specifically, the first sub-block category, the second sub-block category, and the third sub-block category may indicate a specific variation (such as a range of values) of AC quantized-transformed residual levels in each 1D sub-block of the plurality of 1D sub-blocks.

In order to identify a sub-block category of a corresponding 1D sub-block at the time of refinement of a 1D sub-block, the encoder circuitry 206 may be configured to allocate a set of signaling bits to each 1D sub-block of the plurality of 1D sub-blocks. The set of signaling bits may be allocated, based on a maximum value of an AC quantized-transformed residual level from a plurality of AC quantized-transformed residual levels in each 1D sub-block of the plurality of 1D sub-blocks. The allocated set of signaling bits may represent a sub-block category for each 1D sub-block of the plurality of 1D sub-blocks, from a set of sub-block categories.

In accordance with an embodiment, the encoder circuitry 206 may be configured to compare the maximum value of an AC quantized-transformed residual level from a plurality of AC quantized-transformed residual levels for each 1D sub-block of the plurality of 1D sub-blocks to a first reference value and a second reference value. The maximum value may be an absolute maximum value that is greater than or equal to 0 and the comparison may determine whether the maximum value for each 1D sub-block of the plurality of 1D sub-blocks is equal to the first reference value or the second reference value, or greater than the second reference value.

In accordance with an embodiment, the allocated set of signaling bits may represent the first sub-block category, for a 1D sub-block of the plurality of 1D sub-blocks, when the maximum value of the plurality of AC quantized-transformed residual levels in the 1D sub-block is equal to the first reference value, such as "0". The allocated set of signaling bits may similarly represent the second sub-block category, for a 1D sub-block of the plurality of 1D sub-blocks, when the maximum value of the plurality of AC quantized-transformed residual levels in the 1D sub-block is equal to the second reference value, such as "1". The allocated set of signaling bits may represent the third sub-block category, for a 1D sub-block of the plurality of 1D sub-blocks, when the maximum value of the plurality of AC quantized-transformed residual levels in the 1D sub-block is greater than the second reference value, such as "1". A number of signaling bits in the allocated set of signaling bits to represent the first sub-block category may be "1" bit. A number of signaling bits in the set of signaling bits to represent the second sub-block category and the third sub-block category may be "2" bits.

In certain embodiments, the first reference value is "0" and the second reference value is "1". Thus, the encoder circuitry 206 may be configured to check whether an AC quantized-transformed residual level in each 1D sub-block is equal to "0", "1", or greater than "1". In an example, a first "4×1" sub-block ($SB_1$), a second a third "4×1" sub-block ($SB_3$), and a third "4×1" sub-block ($SB_3$) of quantized-transformed residual levels may be given as follows:

$SB_1$=[−13 0 0 0]
$SB_2$=[−13 1 1 0]
$SB_3$=[−7 6 0 −2]

Here, sub-block $SB_1$ has all the AC quantized-transformed residual levels as "0", and therefore, the absolute maximum value of AC quantized-transformed residual levels in the sub-block $SB_1$ is "0". Sub-block $SB_2$ may have two of the AC quantized-transformed residual levels as "1" and one of the AC quantized-transformed residual level as "0". Thus, the absolute maximum value of AC quantized-transformed residual levels in the sub-block $SB_2$ is "1". In sub-block $SB_3$, the AC quantized-transformed residual levels are "6", "0", "0",
and "−2". The absolute maximum value of AC quantized-transformed residual levels is "6" in the sub-block $SB_3$. In this example, the absolute maximum value of AC quantized-transformed residual levels in the sub-block $SB_1$ is equal to "0", which is equal to the first reference value of "0". Thus, the sub-block $SB_1$ may be allocated one signaling bit, such as "0", as part of an allocation of a set of signaling bits, which may indicate that the sub-block $SB_1$ is identified by a first sub-block category (that represents substantial flatness level). The absolute maximum value of AC quantized-transformed residual levels in the sub-block $SB_2$ is equal to "1", which is equal to the second reference value of "1". Thus, the sub-block $SB_2$ may be allocated two signaling bits, such as "10", as part of an allocation of a set of signaling bits, which may indicate that the sub-block $SB_2$ is identified by a second sub-block category (that represents moderate flatness level). The absolute maximum value of AC quantized-transformed residual levels in the sub-block $SB_3$ is equal to "6", which is greater than the first reference value of "0" and the second reference value of "1". Thus, the sub-block $SB_3$ may be allocated two signaling bits, such as "11", as part of an allocation of a set of signaling bits, which may indicate that the sub-block $SB_3$ is identified by a third sub-block category (that represents low flatness level or a high complexity level).

The encoder circuitry 206 may be configured to encode each 1D sub-block of the plurality of 1D sub-blocks by application of an entropy coding scheme to generate a plurality of encoded 1D sub-blocks. The entropy coding scheme may be, but is not limited to, a Huffman coding scheme, an exponential Golomb coding scheme, a progressive Golomb coding scheme, a Golomb-Rice coding scheme, or a combination of the Huffman coding scheme and the exponential Golomb coding scheme.

The plurality of encoded 1D sub-blocks may include encoded quantized-transformed residual levels corresponding to quantized-transformed residual levels in the plurality of 1D sub-blocks. The encoded quantized-transformed residual levels are represented by a plurality of bits in bit-planes. The number of bit-planes may be equal to a bit-depth specified prior to encoding. For example, for input image data of 10 bit-depth, the specified bit-depth may be 5 bit-depth for output image data. Here, 10 bit-depth and 5 bit-depth correspond to the number of bit-planes in the input image data and the output image data respectively. After entropy coding, each encoded quantized-transformed residual level may not require 5 bits. Thus, the vacant bit-positions in the bit-planes may be allocated with refinement bits to improve the output image quality.

In accordance with an embodiment, the encoder circuitry 206 may be configured to determine a number of refinement bits to be allocated based on the specified bit-depth and a number of bits occupied by the encoded quantized-transformed residual levels. For example, for a 16×1 image block the specified bit-depth may be equal to 5. The total number of bits in the encoded image block will be "16×5=80 bits", but after entropy coding, the encoded quantized-transformed residual levels may occupy only 70 bits. Thus, the encoder circuitry 206 may determine the number of refinement bits as the difference of the total number of bits and the number of bits actually occupied, "80−70=10 bits".

The encoder circuitry 206 may be configured to allocate the determined number of refinement bits in one or more bit-planes of the plurality of 1D sub-blocks, based on the sub-category of each 1D sub-block of the plurality of 1D sub-blocks. The number of refinement bits allocated in a 1D sub-block of the plurality of 1D sub-blocks may depend on the sub-block category of the 1D sub-block. The allocated set of signaling bits may be used as a decision factor to determine the number of refinement bits to be allocated in a corresponding 1D sub-block. More specifically, the allocation set of signaling bits would signal the encoder circuitry 206 about a level of complexity or flatness of a 1D sub-block and the encoder circuitry 206 may store decision tables or instructions that may specify a number of refinement bits and positions of refinement bits for a corresponding 1D sub-block.

In accordance with an embodiment, for a 1D sub-block associated with the first sub-block category, "2" refinement bits may be allocated at bit-positions corresponding to a DC quantized-transformed residual level and an AC quantized-transformed residual level. For a 1D sub-block associated with the second sub-block category, "3" refinement bits may be allocated at bit-positions corresponding to a DC quantized-transformed residual level, a first AC quantized-transformed residual level, and a second AC quantized-transformed residual level. For a 1D sub-block associated with the third sub-block category, the number of refinement bits may be equal to a count of DC quantized-transformed residual level and AC quantized-transformed residual levels in the 1D sub-block. In other words, the refinement bits may be allocated at bit-positions corresponding to a DC quantized-transformed residual level and each AC quantized-transformed residual level. Here, it should be noted that the number of refinement bits for the first sub-category and the second sub-block category is not limited to "2" and "3". The number of refinement bits for each sub-block category may be determined based on an analysis of distribution of pixel values of an input image block and/or experimentations, and a threshold value may be set for each sub-block category. But, the number of refinement bits for the second sub-block category (moderately complex sub-block) cannot be lower than the number of refinement bits for the first sub-block category (flat sub-block).

For example, for a "4×1" sub-block ($B_1$), given by $B_1$=[−13 0 0 0] all the AC quantized-transformed residual levels are '0', the "4×1" sub-block "$B_1$" may be associated with the first sub-block category. Thus, for "$B_1$", '2' refinement bits may be allocated at a position corresponding to the DC quantized-transformed residual level (−13) and a position corresponding to first AC quantized-transformed residual level (0). For a "4×1" sub-block ($B_2$), given by $B_2$=[−13 1 1 0], the absolute maximum value from all of the AC quantized-transformed residual levels is '1' (−13 is DC component), "$B_2$" may be associated with the second sub-block category. Thus, for "$B_2$", '3' refinement bits may be allocated at a position corresponding to the DC quantized-transformed residual level (−13) and first two AC quantized-transformed residual levels (first two 0). For a "4×1" sub-block ($B_3$), given by $B_3$=[−7 6 0 −2] the absolute maximum value from all of the AC quantized-transformed residual levels is '6', "$B_3$" may be associated with the third sub-block category. Thus, for "$B_3$", '4' refinement bits may be allocated at a position corresponding to the DC quantized-transformed residual level (−7) and all AC quantized-transformed residual levels (6, 0, −2).

In accordance with another embodiment, the encoder circuitry 206 may be configured to determine a refinement order based on the sub-category of each 1D sub-block of the plurality of 1D sub-blocks. The refinement order may correspond to a sequence of positions in a bit-plane of the plurality of bit-planes (the bit-plane that may comprise un-coded bit positions). For example, the refinement order [1, 2, 5, 6, 7, 9, 10, 11, 12] may define that the allocation of refinement bits may begin at $1^{st}$ bit-position, proceed to $2^{nd}$ bit-position and follow the sequence till $12^{th}$ bit-position. The refinement order may be determined as positions of quantized-transformed residual levels corresponding to sub-block category of each 1D sub-block. The encoder circuitry 206 may be further configured to allocate the refinement bits based on the determined refinement order.

In accordance with an embodiment, the refinement bits may be still available after first pass of refinement. For example, there may be total '10' refinement bits to be allocated, but after the first pass of refinement (i.e., allocating refinement bits based on the sub-block category) '2' refinement bits may still left to be allocated. In such a scenario, the encoder circuitry 206 may be further configured to allocate the remaining refinement bits at positions corresponding to AC quantized-transformed residual levels, at which the refinement bits may not be allocated in the first pass of refinement.

In conventional refinement techniques, initially the refinement bits may be allocated at positions corresponding to DC quantized-transformed residual levels in each 1D sub-block. In first pass of refinement, only '1' refinement bit per 1D sub-block may be allocated at positions corresponding to DC quantized-transformed residual levels. In cases where, the refinement bits may be still available after the first pass, the remaining refinement bits may be allocated at positions corresponding to AC quantized-transformed residual levels. In such cases, the 1D image block may not be categorized based on flatness levels or complexity levels in the 1D image block, which may not allow optimal allocation of the refinement bits to the sub-blocks that require more number of refinement bits as compared to other sub-blocks. For example, the refinement bits to be allocated may be '4' and the number of sub-blocks that may have un-coded bits, may be also '4'. Using conventional refinement techniques, each sub-block may be allocated only '1' refinement bit in the first pass. This may not be optimal utilization of the refinement bits as a sub-block (with high complexity level) may be allocated with same number of refinement bits as another sub-block (with relatively flat level). Thus, the allocation of refinement bits, in accordance with an embodiment of the disclosure, may ensure the optimal utilization of the refinement bits by allocating more number of refinement bits to the sub-block (with high complexity level) as compared to the sub-block (with relatively flat level). Such allocation of refinement bits improves compression efficiency is significantly improved without an adverse impact on quality of encoded image. Further, the coding artifacts are also reduced as the complex sub-blocks are allocated with more number of refinement bits.

Figure 3:
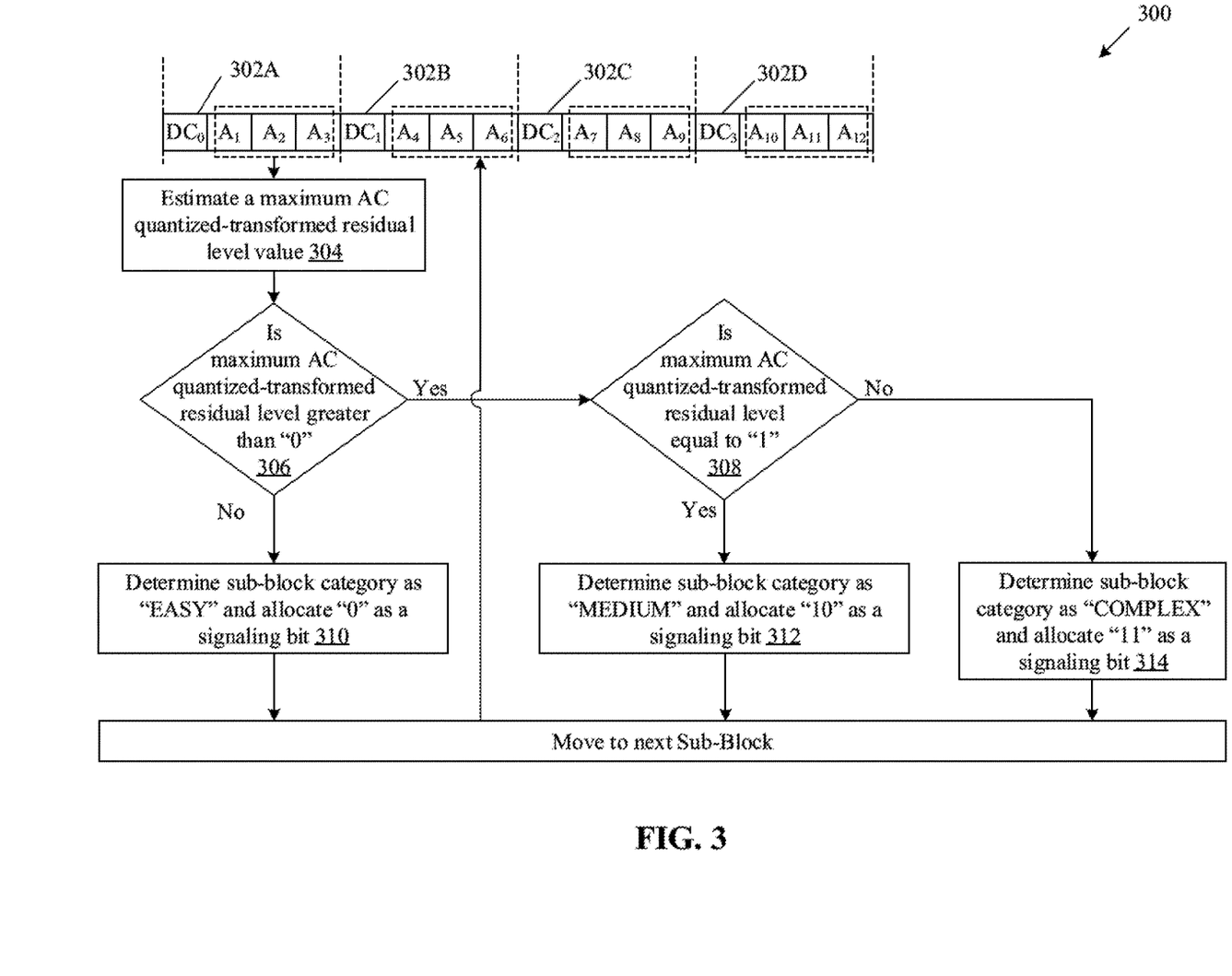
FIG. 3 illustrates categorization of sub-blocks based on quantized-transformed residual levels, by the EBC circuitry of FIG. 2, in accordance with an embodiment of the disclosure.

FIG. 3 illustrates categorization of sub-blocks based on quantized-transformed residual levels, by the EBC circuitry of FIG. 2, in accordance with an embodiment of the disclosure. FIG. 3 is explained in conjunction with elements from FIG. 1 and FIG. 2. With reference to FIG. 3, there is shown a flow diagram 300. The flow diagram 300 describes certain operations executed by the encoder circuitry 206 while encoding a plurality of 1D sub-blocks of quantized-transformed residual levels obtained after a sequential application of 1D forward transform, quantization, and a residual prediction on a 1D image block (partitioned into a plurality of 1D image sub-blocks). There is shown a set of 1D sub-blocks, such as a sub-block 302A, a sub-block 302B, a sub-block 302C, and a sub-block 302D. The encoder circuitry 206 may be configured to sequentially (or in parallel) select a sub-block, such as the sub-block 302A, and determine a sub-block category, for example, "EASY", "MEDIUM", or "COMPLEX", for the selected sub-block.

At 304, the encoder circuitry 206 may be configured to estimate a maximum AC quantized-transformed residual level value for the sub-block 302A. In the sub-block 302A, the AC quantized-transformed residual levels are A1, A2, and A3. The encoder circuitry 206 may be configured to estimate a maximum value from $A_1$, $A_2$, and $A_3$, which may be $A_1$, for example.

At 306, the encoder circuitry 206 may be configured to determine whether the maximum AC quantized-transformed residual level is greater than "0". If, the maximum AC quantized-transformed residual levels in the sub-block 302A are greater than "0", the sub-block 302A may be either classified into a "MEDIUM" sub-block category or a "COMPLEX" sub-block category based on whether the maximum AC quantized-transformed residual level is equal to "1" or more than "1". The "MEDIUM" sub-block category may correspond to the second sub-block category and the "COMPLEX" sub-block category may correspond to the third sub-block category. In a case where the maximum AC quantized-transformed residual level is greater than "0", control passes to 308. Otherwise, control passes to 310.

At 308, the encoder circuitry 206 may be configured to determine whether the maximum AC quantized-transformed residual level is equal to "1". At this stage, the encoder circuitry 206 may be configured to classify the sub-block 302A into either the "MEDIUM" sub-block category or the "COMPLEX" sub-block category. In a case where the maximum AC quantized-transformed residual level is equal to "1", control passes to 312. Otherwise, control passes to 314.

At 310, the encoder circuitry 206 may be configured to determine the sub-block category of the sub-block 302A as the "EASY" sub-block category, based on the maximum AC quantized-transformed residual level that is equal to "0". The encoder circuitry 206 may be further configured to allocate the signaling bit as "0" corresponding to the "EASY" sub-block category. After the sub-block 302A has been categorized, the control may move to the next sub-block, such as the sub-block 302B.

At 312, the encoder circuitry 206 may be configured to determine the sub-block category of the sub-block 302A as the "MEDIUM" sub-block category, based on the maximum AC quantized-transformed residual level that is equal to "1". The encoder circuitry 206 may be further configured to allocate the signaling bit as "10" corresponding to the "MEDIUM" sub-block category. After the sub-block 302A has been categorized, the control may move to the next sub-block, such as the sub-block 302B.

At 314, the encoder circuitry 206 may be configured to determine the sub-block category of the sub-block 302A as the "COMPLEX" sub-block category, based on the maximum AC quantized-transformed residual level that is greater than "1". The encoder circuitry 206 may be further configured to allocate the signaling bit as "11" corresponding to the "COMPLEX" sub-block category. After the sub-block 302A has been categorized, the control may move to the next sub-block, such as the sub-block 302B. Similarly, all sub-blocks such as the sub-block 302B, 302C, and 302D, may be processed. In some embodiments, the processing of the sub-blocks 302A to 302D may be executed concurrently. It should also be noted that the sub-block categories are not limited to the "EASY", "MEDIUM", and "COMPLEX" sub-block categories. In some embodiments, there may be two or more than two sub-block categories. For example, "EASY", "MEDIUM1", "MEDIUM2", and "COMPLEX".

As an example, image/video compression in medical applications, where priority is high image quality, the number of sub-block categories may be higher than image/video compression in applications where priority is storage capacity. In other words, rules to define a plurality of sub-categories may be defined in accordance with an application or end objective.

Figure 4:
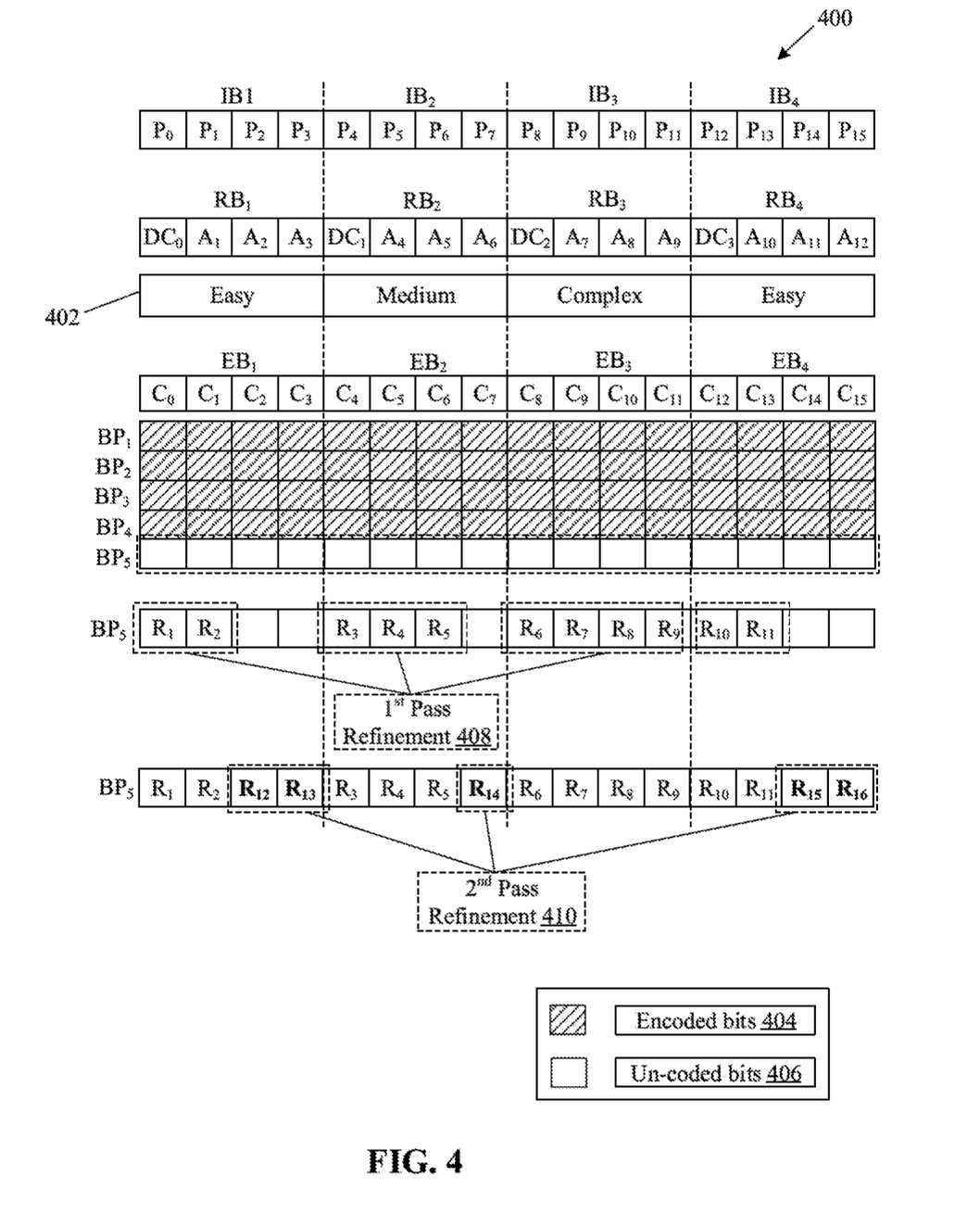
FIG. 4 illustrates application of an exemplary sequential encoding scheme on a 1D image block by the EBC circuitry of FIG. 2, for sub-block based allocation of refinement bits, in accordance with an embodiment of the disclosure.

FIG. 4 illustrates application of an exemplary sequential encoding scheme on a 1D image block by the EBC circuitry of FIG. 2, for sub-block based allocation of refinement bits, in accordance with an embodiment of the disclosure. FIG. 4 is explained in conjunction with elements from FIGS. 1, 2, and 3. With reference to FIG. 4, there is shown a diagram 400 that shows output at different stages of the encoder circuitry 206 while applying a sequential entropy coding scheme on a 16×1 image block, followed by allocation of refinement bits.

Initially, the encoder circuitry 206 may be configured to retrieve a 16×1 image block that may be partitioned into four image sub-blocks. For example, the first sub-block $IB_1$ may include four pixel values $P_0$, $P_1$, $P_2$, and $P_3$ in an example. Similarly, $IB_2=[P_4, P_5, P_6, P_7]$, $IB_3=[P_8, P_9, P_{10}, P_{11}]$, and $IB_4=[P_{12}, P_{13}, P_{14}, P_{15}]$. The encoder circuitry 206 may be configured to apply a 1D forward transform, followed by a quantization scheme and a residual prediction scheme, on each of $IB_1$, $IB_2$, $IB_3$, and $IB_4$ to obtain four sub-blocks of quantized-transformed residual levels. For example, a sub-block $RB_1$ obtained from the first sub-block $IB_1$, may include a DC quantized-transformed residual level $DC_0$ and AC quantized-transformed residual levels $A_1$, $A_2$, and $A_3$ in an example. Similarly, $RB_2=[DC_1, A_4, A_5, A_6]$, $RB_3=[DC_2, A_7, A_8, A_9]$, and $RB_4=[DC_3, A_{10}, A_{11}, A_{12}]$. Thereafter, the encoder circuitry 206 may be configured to classify each sub-block of quantized-transformed residual levels "$RB_1$, $RB_2$, $RB_3$, and $RB_4$" into a sub-block category of a plurality of sub-block categories 402, which may be indicated as, for example, "Easy", "Medium", "Complex", and "Easy" for $RB_1$, $RB_2$, $RB_3$, and $RB_4$, respectively. The first and fourth sub-blocks of quantized-transformed residual levels "$RB_1$" and "$RB_4$" may have "0" as the maximum quantized-transformed residual level value and therefore, the sub-block category may be determined as "Easy" for $RB_1$ and $RB_4$. The second sub-block of quantized-transformed residual level "$RB_2$" may have "1" as the maximum quantized-transformed residual level value and therefore, the sub-block category may be determined as "Medium" for $RB_2$. The third sub-block of quantized-transformed residual level, "$RB_3$", may have the maximum quantized-transformed residual level value greater than "1" and therefore, the sub-block category may be determined as "Complex" for $RB_3$.

The encoder circuitry 206 may be configured to apply an entropy coding scheme on each of $RB_1$, $RB_2$, $RB_3$, and $RB_4$ to obtain four encoded sub-blocks. For example, an encoded sub-block $EB_1$ obtained from the sub-block $RB_1$, may include encoded quantized-transformed residual levels $C_0$, $C_1$, $C_2$, and $C_3$ in an example. Similarly, $EB_2=[C_4, C_5, C_6, C_7]$, $EB_3=[C_8, C_9, C_{10}, C_{11}]$, and $EB_4=.[C_{12}, C_{13}, C_{14}, C_{15}]$. Each of $C_0$, $C_1$, $C_2$, . . . , $C_{15}$ may be represented as sequence of bits in bit-planes, i.e. $BP_1$, $BP_2$, $BP_3$, $BP_4$, and $BP_5$, corresponding to $DC_0$, $A_1$, $A_2$, $A_3$, $DC_1$, $A_4$, . . . $DC_3$, $A_{10}$, $A_{11}$, $A_{12}$. The number of bit-planes may be equal to the bit-depth specified prior to encoding operation ('5' in this case). As shown, as an example, the bit-planes $BP_1$, $BP_2$, $BP_3$, and $BP_4$ may comprise encoded-bits 404, and the bit plane $BP_5$ may comprise un-coded bits 406, which may be vacant positions where refinement bits may be allocated.

The encoder circuitry 206 may be configured to determine a count of refinement bits to be allocated, based on the specified bit-depth and a number of encoded bits 404. For example, the specified bit-depth is '5' for '16' input pixel values and the total number of bits may be equal to "16×5", i.e. 80 bits. As only the bit-planes $BP_1$, $BP_2$, $BP_3$, and $BR_4$ comprise encoded bits (16×4=64 bits), the count of refinement bits may be determined as "80-64", i.e. 16 bits. In another scenario, the bit-plane $BP_5$ may also comprise encoded bits (say '6' bits), then the count of refinement bits may reduce to '10' bits.

As shown, as an example, the fifth bit-plane $BP_5$ comprises all the un-coded bits 404. The encoder circuitry 206 may be configured to allocate refinement bits, i.e. $R_1$, $R_2$, $R_3$, . . . , $R_{16}$, in the fifth bit-plane $BP_5$. However, the refinement bits $R_1$, $R_2$, $R_3$, . . . , $R_{11}$ may be allocated sequentially in a first pass of refinement 408 based on the number of sub-blocks ('4' in this case) and the sub-block categories. In a case where, the refinement bits may be still available after the first pass of refinement 408, the encoder circuitry 206 may be configured to allocate the remaining refinement bits at remaining positions in the bit-planes, in a second pass of refinement 410. Here, the count of refinement bits is determined as '16' and after the first pass of refinement 408 '11' refinement bits have been allocated. Therefore, the remaining '5' refinement bits $R_{12}$, $R_{13}$, . . . , $R_{16}$ may be allocated in the second pass of refinement 410.

In the first pass of refinement 408, the encoder circuitry 206 may be configured to sequentially allocate the refinement bits in the bit-plane $BP_5$ in each of the encoded sub-blocks $EB_1$, $EB_2$, $EB_3$, and $EB_4$ based on the sub-block categories. As encoded sub-block $EB_1$ belongs to "Easy" sub-block category, '2' refinement bits, i.e. $R_1$ and $R_2$ may be allocated at positions corresponding to $DC_0$ and $A_1$. As encoded sub-block $EB_2$ belongs to "Medium" sub-block category, '3' refinement bits, i.e. $R_3$, $R_4$, and $R_5$ may be allocated at positions corresponding to $DC_1$, $A_4$, and $A_5$. As encoded sub-block $EB_3$ belongs to "Complex" sub-block category, '4' refinement bits (at each position available in complex sub-block), i.e. $R_6$, $R_7$, $R_8$, and $R_9$ may be allocated at positions corresponding to $DC_2$, $A_7$, $A_8$, and $A_9$. As encoded sub-block Ell' belongs to "Easy" sub-block category, '2' refinement bits, i.e. $R_{10}$ and $R_{11}$ may be allocated at positions corresponding to $DC_3$ and $A_{10}$. The positions in the bit-plane $BP_5$, at which the refinement bits may be allocated in the first pass of refinement, may correspond to positions of high priority. The high priority may specify that the allocation of refinement bits at these positions will have more impact on the image quality as compared to the allocation at other positions.

In the second pass of refinement 410, the encoder circuitry 206 may be further configured to allocate remaining refinement bits at positions corresponding to remaining AC quantized-transformed residual levels, in the bit-plane $BP_5$. As encoded sub-block $EB_1$, $EB_2$, and $E_4$ comprise positions corresponding to $A_2$, $A_3$, $A_6$, $A_{11}$, and $A_{12}$, the remaining refinement bits ($R_{12}$, $R_{13}$, . . . , $R_{16}$) may be allocated sequentially at these positions. The positions corresponding to $A_2$, $A_3$, $A_6$, $A_{11}$, and $A_{12}$ may correspond to positions of low priority. The low priority may specify that the allocation of refinement bits at these positions will have lesser impact on the image quality as compared to the allocation at the positions of high priority.

Figure 5A:
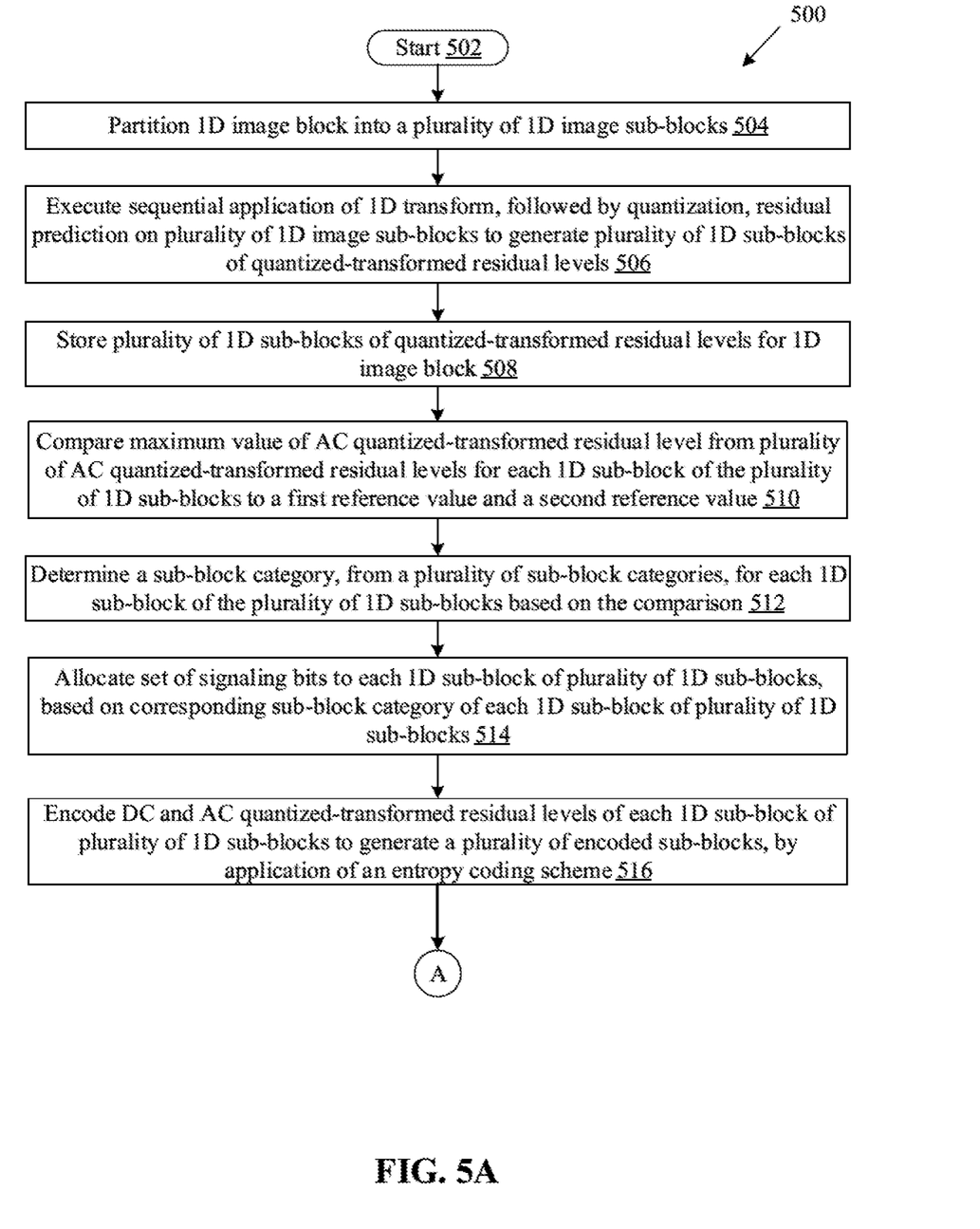
FIGS. 5A and 5B, collectively, depicts a flowchart that illustrates an exemplary method for sub-block based allocation of refinement bits, in accordance with an embodiment of the disclosure.
Figure 5B:
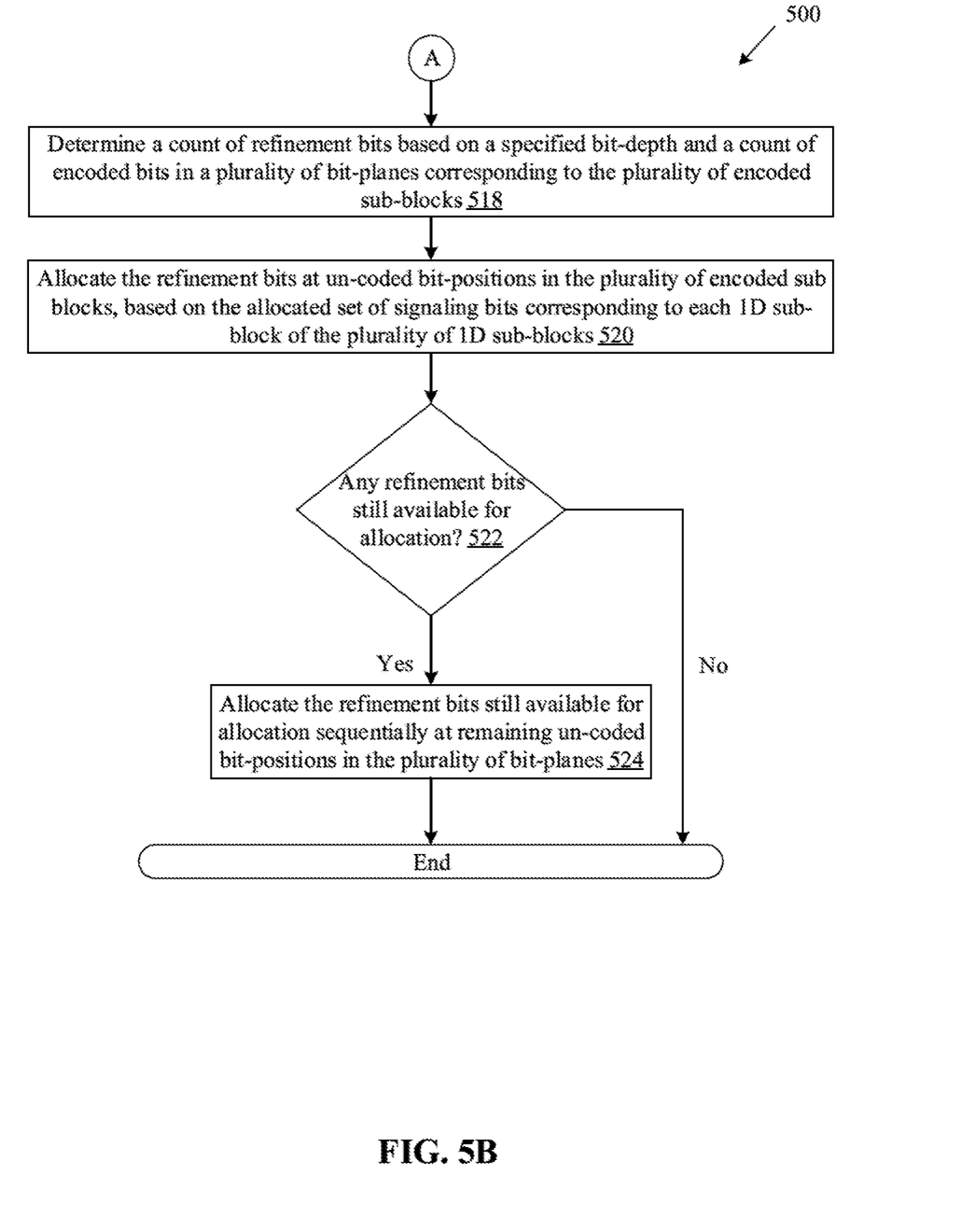

FIGS. 5A and 5B, collectively, depicts a flowchart that illustrates an exemplary method for sub-block based allocation of refinement bits, in accordance with an embodiment of the disclosure. FIGS. 5A and 5B are explained in conjunction with elements from FIGS. 1, 2, 3, and 4. With reference to FIGS. 5A and 5B, there is shown a flowchart 500 implemented in the EBC circuitry 108. The method starts at 502 and proceeds to 504.

At 504, a 1D image block may be partitioned into a plurality of 1D image sub-blocks. The encoder circuitry 206 may be configured to partition the 1D image block, for example, a "16×1" image block, into a plurality of 1D image sub-blocks.

At 506, a sequential application of a 1D transform, followed by quantization, a residual prediction may be executed on the plurality of 1D image sub-blocks to generate a plurality of 1D sub-blocks of quantized-transformed residual levels. The encoder circuitry 206 may be configured to execute a sequential application of a 1D transform, followed by quantization, a residual prediction on the plurality of 1D image sub-blocks to generate a plurality of 1D sub-blocks of quantized-transformed residual levels.

At 508, a plurality of 1D sub-blocks of quantized-transformed residual levels may be stored for the 1D image block. The memory, such as the on-chip memory 204 or the external memory 110, may be configured to store the plurality of 1D sub-blocks of quantized-transformed residual levels for the 1D image block.

At 510, a maximum value of AC quantized-transformed residual level from a plurality of AC quantized-transformed residual levels for each 1D sub-block of the plurality of 1D sub-blocks may be compared to a first reference value and a second reference value. The encoder circuitry 206 may be configured to compare a maximum value of AC quantized-transformed residual level from a plurality of AC quantized-transformed residual levels to a first reference value for each 1D sub-block of the plurality of 1D sub-blocks.

At 512, a sub-block category of a plurality of sub-categories may be determined for each 1D sub-block of the plurality of 1D sub-blocks, based on the comparison. The encoder circuitry 206 may be configured to determine a sub-block category of a plurality of sub-categories for each 1D sub-block of the plurality of 1D sub-blocks, based on the comparison.

At 514, a set of signaling bits may be allocated to each 1D sub-block of the plurality of 1D sub-blocks, based on corresponding sub-block category of each 1D sub-block of the plurality of 1D sub-blocks. The encoder circuitry 206 may be configured to allocate a set of signaling bits to each 1D sub-block of the plurality of 1D sub-blocks, based on corresponding sub-block category of each 1D sub-block of the plurality of 1D sub-blocks.

At 516, DC and AC quantized-transformed residual levels of each 1D sub-block of the plurality of 1D sub-blocks may be encoded to generate a plurality of encoded sub-blocks, by application of an entropy coding scheme. The plurality of encoded sub-blocks may comprise a plurality of encoded bits in a plurality of bit-planes. The encoder circuitry 206 may be configured to encode each 1D sub-block of the plurality of 1D sub-blocks to generate the plurality of encoded sub-blocks, by application of the entropy coding scheme.

At 518, a count of refinement bits may be determined based on a specified bit-depth and a count of encoded bits in the plurality of bit-planes corresponding to the plurality of bit-planes. The encoder circuitry 206 may be configured to determine a count of refinement bits based on the specified bit-depth and the count of encoded bits in the plurality of bit-planes.

At 520, the refinement bits may be allocated at un-coded bit-positions in the plurality of encoded sub-blocks, based on the allocated set of signaling bits corresponding to each 1D sub-block of the plurality of 1D sub-blocks. The encoder circuitry 206 may be configured to allocate the refinement bits at un-coded bit-positions in the plurality of bit-planes, based on the allocated set of signaling bits corresponding to each 1D sub-block of the plurality of 1D sub-blocks.

At 522, it may be determined whether any refinement bits of the determined count of refinement bits are still available for allocation. The encoder circuitry 206 may be configured to determine whether any refinement bits of the determined count of refinement bits are still available for allocation. In cases where any refinement bits of the determined count of refinement bits are still available for allocation, then the control passes to 524, or else the control passes to end.

At 524, the refinement bits still available for allocation may be allocated sequentially at remaining un-coded bit-positions in the plurality of bit-planes. The encoder circuitry 206 may be configured to allocate the refinement bits still available for allocation, sequentially at remaining un-coded bit-positions in the plurality of bit-planes. The control may pass to end.

Certain embodiments of the disclosure may be found in an embedded codec (EBC) circuitry (e.g., the EBC circuitry 108 (FIG. 1)). Various embodiments of the disclosure may provide the EBC circuitry that may include a memory (e.g., the on-chip memory 204 (FIG. 2)) and an encoder circuitry (e.g., the encoder circuitry 206 (FIG. 2)) communicatively coupled to the memory. The memory may be configured to store a plurality of one dimensional (1D) sub-blocks of quantized-transformed residual levels (e.g., the sub-blocks 302A, 302B, 302C, and 302D (FIG. 3)) for a 1D image block. The encoder circuitry may be configured to determine a sub-block category from a set of sub-block categories (e.g., the sub-block categories 402 (FIG. 4)) for each 1D sub-block of the plurality of 1D sub-blocks. The sub-block category may be determined based on a maximum value of an AC quantized-transformed residual level from a plurality of AC quantized-transformed residual levels in each 1D sub-block of the plurality of 1D sub-blocks. Each sub-block category of the set of sub-block categories may indicate a different flatness level and a complexity level for a corresponding 1D sub-block of the plurality of 1D sub-blocks. The encoder circuitry may be further configured to encode the plurality of 1D sub-blocks by application of an entropy coding scheme to generate a plurality of encoded 1D sub-blocks (e.g., the encoded sub-blocks $EB_1$, $EB_2$, $EB_3$, and $EB_4$ (FIG. 4)). The encoder circuitry may be further configured to allocate a plurality of refinement bits (e.g., the refinement bits $R_1, R_2, R_3, \ldots, R_{16}$ (FIG. 4)) at bit-positions in a set of bit-planes corresponding to a set of encoded quantized-transformed residual levels in an encoded 1D sub-block of the plurality of encoded 1D sub-blocks. The plurality of refinement bits may be allocated based on the sub-block category of a 1D sub-block of the plurality of 1D sub-blocks, which corresponds to the encoded 1D sub-block.

In accordance with an embodiment, the encoder circuitry may be further configured to encode the 1D image block by a sequential encoding scheme to generate the plurality of encoded 1D sub-blocks. The sequential encoding scheme may include a sequential application of a 1D transform, followed by quantization, a residual prediction, and the entropy coding scheme.

In accordance with an embodiment, the encoder circuitry may be further configured to apply a 1D transform on the 1D image block to generate the plurality of 1D sub-blocks. Each 1D sub-block of the plurality of 1D sub-blocks may comprise a DC quantized-transformed residual level and the plurality of AC quantized-transformed residual levels. A type of the 1D transform applied on the 1D image block may be based on a size of each 1D sub-block of the plurality of 1D sub-blocks. The size of each 1D sub-block of the plurality of 1D sub-blocks may be specified prior to encode of the 1D image block. Each encoded 1D sub-block of the plurality of encoded 1D sub-blocks may comprise a plurality of encoded quantized-transformed residual levels (e.g., the encoded quantized-transformed residual levels $C_0$, $C_1$, $C_2, \ldots, C_{15}$ (FIG. 4)). Each encoded quantized-transformed residual level of the plurality of encoded quantized-transformed residual levels may comprise a set of bits (e.g., the encoded bits 404 (FIG. 4)) that correspond to a defined bit-depth. A number of refinement bits for the allocation of the plurality of refinement bits may be based on the defined bit-depth and the set of bits. The plurality of encoded quantized-transformed residual levels may comprise a DC quantized-transformed residual encoded level corresponding to the DC quantized-transformed residual level and a plurality of AC quantized-transformed residual encoded levels corresponding to the plurality of AC quantized-transformed residual levels. The set of encoded quantized-transformed residual levels may comprise the DC quantized-transformed residual encoded level and at least one of the plurality of AC quantized-transformed residual encoded levels.

In accordance with an embodiment, the encoder circuitry may be further configured to allocate a set of signaling bits to each 1D sub-block of the plurality of 1D sub-blocks, based on the sub-block category of each 1D sub-block of the plurality of 1D sub-blocks. The encoder circuitry may be further configured to select the set of encoded quantized-transformed residual levels in the encoded 1D sub-block based on the allocated set of signaling bits to the first 1D sub-block corresponding to the encoded 1D sub-block.

In accordance with an embodiment, a count of encoded quantized-transformed residual levels in the set of encoded quantized-transformed residual levels may depend on the determined sub-block category of the first 1D sub-block corresponding to the first encoded 1D sub-block.

In accordance with an embodiment, a count of encoded quantized-transformed residual levels in the set of encoded quantized-transformed residual levels may be different for each sub-block category of the set of sub-block categories.

In accordance with an embodiment, the encoder circuitry may be further configured to compare the maximum value of the AC quantized-transformed residual level for each 1D sub-block of the plurality of 1D sub-blocks to a first reference value and a second reference value. The maximum value may be an absolute maximum value that is greater than or equal to 0. In certain embodiments, the first reference value is 0 and the second reference value is 1. The set of sub-block categories may include a first sub-block category, a second sub-block category, and a third sub-block category. In one instance, the sub-block category may be determined as the first sub-block category, for a 1D sub-block of the plurality of 1D sub-blocks, when the maximum value of the plurality of AC quantized-transformed residual levels in the 1D sub-block is equal to the first reference value. In a second instance, the sub-block category may be determined as the second sub-block category, for a 1D sub-block of the plurality of 1D sub-blocks, when the maximum value of the plurality of AC quantized-transformed residual levels in the 1D sub-block is equal to the second reference value. In a third instance, the sub-block category may be determined as the third sub-block category, for a 1D sub-block of the plurality of 1D sub-blocks, when the maximum value of the plurality of AC quantized-transformed residual levels in the 1D sub-block is greater than the second reference value. In certain embodiments, a first count of encoded quantized-transformed residual levels in the set of encoded quantized-transformed residual levels for the second sub-block category may be greater than or equal to a second count of encoded quantized-transformed residual levels in the set of encoded quantized-transformed residual levels for the first sub-block category. A third count of encoded quantized-transformed residual levels in the set of encoded quantized-transformed residual levels for the third sub-block category may be greater than the first count and the second count In accordance with an embodiment, the encoder circuitry may be configured to determine a refinement order in the first encoded 1D sub-block based on the sub-block category of the first 1D sub-block. The refinement order may define a sequence in which the plurality of refinement bits is allocated at the bit-positions in the set of bit-planes. The encoder circuitry may be further configured to allocate a first refinement bit of the plurality of refinement bits at a first bit-position in the set of bit-planes corresponding to the set of encoded quantized-transformed residual levels, followed by allocation of subsequent refinement bits of the plurality of refinement bits at subsequent positions in the set of bit-planes. The allocation of the plurality of refinement bits may be based on the determined refinement order. The first bit-position may correspond to a first encoded quantized-transformed residual level in the set of encoded quantized-transformed residual levels.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An embedded codec (EBC) circuitry, comprising:
a memory configured to store a plurality of one dimensional (1D) sub-blocks of quantized-transformed residual levels for a 1D image block; and
encoder circuitry configured to:
compare a maximum value of an AC quantized-transformed residual level from a plurality of AC quantized-transformed residual levels for each 1D sub-block of the plurality of 1D sub-blocks with a first reference value and a second reference value;
determine a sub-block category from a set of sub-block categories for each 1D sub-block of the plurality of 1D sub-blocks, based on the comparison of the maximum value of the AC quantized-transformed residual level from the plurality of AC quantized-transformed residual levels in each 1D sub-block of the plurality of 1D sub-blocks with the first reference value and the second reference value, wherein each sub-block category of the set of sub-block categories indicates a different flatness level and a complexity level for a corresponding 1D sub-block of the plurality of 1D sub-blocks;
encode the plurality of 1D sub-blocks by application of an entropy coding scheme to generate a plurality of encoded 1D sub-blocks; and
allocate a plurality of refinement bits at bit-positions in a set of bit-planes corresponding to a set of encoded quantized-transformed residual levels in a first encoded 1D sub-block of the plurality of encoded 1D sub-blocks, based on the sub-block category of a first 1D sub-block of the plurality of 1D sub-blocks, wherein the first 1D sub-block corresponds to the first encoded 1D sub-block.

2. The EBC circuitry according to claim 1, wherein the encoder circuitry is further configured to encode the 1D image block by a sequential encoding scheme to generate the plurality of encoded 1D sub-blocks,
wherein the sequential encoding scheme comprises a sequential application of a 1D transform, quantization, residual prediction, and the entropy coding scheme.

3. The EBC circuitry according to claim 1, wherein
the encoder circuitry is further configured to apply a 1D transform on the 1D image block to generate the plurality of 1D sub-blocks, and
each 1D sub-block of the plurality of 1D sub-blocks comprises a DC quantized-transformed residual level and the plurality of AC quantized-transformed residual levels.

4. The EBC circuitry according to claim 3, wherein
a type of the 1D transform is based on a size of each 1D sub-block of the plurality of 1D sub-blocks, and
the size of each 1D sub-block of the plurality of 1D sub-blocks is specified prior to encode of the 1D image block.

5. The EBC circuitry according to claim 3, wherein each encoded 1D sub-block of the plurality of encoded 1D sub-blocks comprises a plurality of encoded quantized-transformed residual levels.

6. The EBC circuitry according to claim 5, wherein
each encoded quantized-transformed residual level of the plurality of encoded quantized-transformed residual levels comprises a set of bits that correspond to a defined bit-depth, and
a number of refinement bits for the allocation of the plurality of refinement bits is based on the defined bit-depth and the set of bits.

7. The EBC circuitry according to claim 5, wherein
the plurality of encoded quantized-transformed residual levels comprises a DC quantized-transformed residual encoded level corresponding to the DC quantized-transformed residual level and a plurality of AC quantized-transformed residual encoded levels corresponding to the plurality of AC quantized-transformed residual levels, and
the set of encoded quantized-transformed residual levels comprises the DC quantized-transformed residual encoded level and at least one of the plurality of AC quantized-transformed residual encoded levels.

8. The EBC circuitry according to claim 1, wherein the encoder circuitry is further configured to allocate a set of signaling bits to each 1D sub-block of the plurality of 1D sub-blocks, based on the sub-block category of each 1D sub-block of the plurality of 1D sub-blocks.

9. The EBC circuitry according to claim 8, wherein the encoder circuitry is further configured to select the set of encoded quantized-transformed residual levels in the first encoded 1D sub-block based on the allocated set of signaling bits to the first 1D sub-block corresponding to the first encoded 1D sub-block.

10. The EBC circuitry according to claim 1, wherein a count of encoded quantized-transformed residual levels in the set of encoded quantized-transformed residual levels depends on the determined sub-block category of the first 1D sub-block corresponding to the first encoded 1D sub-block.

11. The EBC circuitry according to claim 1, wherein a count of encoded quantized-transformed residual levels in the set of encoded quantized-transformed residual levels is different for each sub-block category of the set of sub-block categories.

12. The EBC circuitry according to claim 1,
wherein the maximum value of the AC quantized-transformed residual level is an absolute maximum value that is greater than or equal to 0.

13. The EBC circuitry according to claim 12, wherein the first reference value is 0 and the second reference value is 1.

14. The EBC circuitry according to claim 12, wherein the set of sub-block categories comprises a first sub-block category, a second sub-block category, and a third sub-block category.

15. The EBC circuitry according to claim 14, wherein the encoder circuitry is further configured to determine the sub-block category for the first 1D sub-block as the first sub-block category based on the comparison, in case the maximum value of the AC quantized-transformed residual level in the first 1D sub-block is equal to the first reference value.

16. The EBC circuitry according to claim 14, wherein the encoder circuitry is further configured to determine the sub-block category for the first 1D sub-block as the second sub-block category based on the comparison, in case the maximum value of the AC quantized-transformed residual level in the first 1D sub-block is equal to the second reference value.

17. The EBC circuitry according to claim 14, wherein the encoder circuitry is further configured to determine the sub-block category for the first 1D sub-block as the third sub-block category based on the comparison, in case the maximum value of the AC quantized-transformed residual level in the first 1D sub-block is greater than the second reference value.

18. The EBC circuitry according to claim 14, wherein
a first count of encoded quantized-transformed residual levels in the set of encoded quantized-transformed residual levels for the second sub-block category is greater than or equal to a second count of encoded quantized-transformed residual levels in the set of encoded quantized-transformed residual levels for the first sub-block category, and
a third count of encoded quantized-transformed residual levels in the set of encoded quantized-transformed residual levels for the third sub-block category is greater than the first count and the second count.

19. The EBC circuitry according to claim 1, wherein
the encoder circuitry is further configured to determine a refinement order in the first encoded 1D sub-block based on the sub-block category of the first 1D sub-block, and
the refinement order defines a sequence in which the plurality of refinement bits is allocated at the bit-positions in the set of bit-planes.

20. The EBC circuitry according to claim 19, wherein
the encoder circuitry is further configured to allocate a first refinement bit of the plurality of refinement bits at a first bit-position in the set of bit-planes corresponding to the set of encoded quantized-transformed residual levels, followed by allocation of subsequent refinement bits of the plurality of refinement bits at subsequent positions in the set of bit-planes,
the allocation is based on the determined refinement order, and
the first bit-position corresponds to a first encoded quantized-transformed residual level in the set of encoded quantized-transformed residual levels.

21. A method, comprising:
in an embedded codec (EBC) circuitry that comprises a memory and encoder circuitry:
storing, by the memory, a plurality of one dimensional (1D) sub-blocks of quantized-transformed residual levels for a 1D input image block;
comparing, by the encoder circuitry, a maximum value of an AC quantized-transformed residual level from a plurality of AC quantized-transformed residual levels for each 1D sub-block of the plurality of 1D sub-blocks with a first reference value and a second reference value;
determining, by the encoder circuitry, a sub-block category from a set of sub-block categories for each 1D sub-block of the plurality of 1D sub-blocks, based on the comparison of the maximum value of the AC quantized-transformed residual level from the plurality of AC quantized-transformed residual levels in each 1D sub-block of the plurality of 1D sub-blocks with the first reference value and the second reference value, wherein each sub-block category of the set of sub-block categories indicates a different flatness level and a complexity level for a corresponding 1D sub-block of the plurality of 1D sub-blocks;
encoding, by the encoder circuitry, the plurality of 1D sub-blocks by application of an entropy coding scheme to generate a plurality of encoded 1D sub-blocks; and
allocating, by the encoder circuitry, a plurality of refinement bits at bit-positions in a set of bit-planes corresponding to a set of encoded quantized-transformed residual levels in a first encoded 1D sub-block of the plurality of encoded 1D sub-blocks, based on the sub-block category of a first 1D sub-block of the plurality of 1D sub-blocks, wherein the first 1D sub-block corresponds to the first encoded 1D sub-block.

\* \* \* \* \*